(12) United States Patent
Lee (10) Patent No.: US 12,428,050 B2
(45) Date of Patent: Sep. 30, 2025

(54) STEERING CONTROL DEVICE AND METHOD

(71) Applicant: HL MANDO CORPORATION, Gyeonggi-do (KR)

(72) Inventor: Kwanghyung Lee, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 53 days.

(21) Appl. No.: 18/440,170

(22) Filed: Feb. 13, 2024

(65) Prior Publication Data

US 2025/0136173 A1   May 1, 2025

(30) Foreign Application Priority Data

Oct. 26, 2023   (KR) ........................ 10-2023-0144503

(51) Int. Cl.
*B62D 5/04*   (2006.01)
*B62D 5/00*   (2006.01)
*B62D 5/30*   (2006.01)

(52) U.S. Cl.
CPC ............. *B62D 5/046* (2013.01); *B62D 5/003* (2013.01); *B62D 5/04* (2013.01); *B62D 5/30* (2013.01)

(58) Field of Classification Search
CPC .......... B62D 5/046; B62D 5/003; B62D 5/30; B62D 5/0481; B62D 5/0484; B62D 5/049
See application file for complete search history.

(56) References Cited

U.S. PATENT DOCUMENTS

| | | | |
|---|---|---|---|
| 2019/0097565 A1* | 3/2019 | Hayakawa | H02P 6/085 |
| 2020/0189607 A1* | 6/2020 | Wesenberg | B62D 5/003 |
| 2020/0406954 A1* | 12/2020 | Szepessy | B62D 6/008 |
| 2022/0234648 A1 | 7/2022 | Park et al. | |
| 2022/0250677 A1 | 8/2022 | Tomizawa | |
| 2022/0253053 A1 | 8/2022 | Niwa et al. | |

FOREIGN PATENT DOCUMENTS

| | | |
|---|---|---|
| DE | 10 2019 201 382 | 8/2019 |
| DE | 11 2020 002 938 | 3/2022 |
| DE | 11 2021 000 985 | 12/2022 |

OTHER PUBLICATIONS

Office Action dated Oct. 25, 2024 for German Patent Application No. 10 2024 105 721.1 and its English translation by Google Translate.

* cited by examiner

*Primary Examiner* — Jacob M Amick (74) *Attorney, Agent, or Firm* — WOMBLE BOND DICKINSON (US) LLP (57) ABSTRACT

The present embodiments relate to a steering control device and method. Specifically, there may be provided a steering control device and method in which an RWA control module may perform control to detect whether a data signal is transmitted/received through a communication module, outputs an operation state for a communication channel of the communication module, and select and use a communication channel capable of data signal transmission/reception to thereby increase reliability and may perform control so that, when any one communication channel fails, data signal transmission/reception is possible through another communication channel.

20 Claims, 6 Drawing Sheets

STEERING CONTROL DEVICE AND METHOD

CROSS-REFERENCE TO RELATED APPLICATION

This application claims priority from Korean Patent Application No. 10-2023-0144503, filed on Oct. 26, 2023, which is hereby incorporated by reference for all purposes as if fully set forth herein.

BACKGROUND

Field

The present embodiments relate to a steering control device and method that outputs a signal for the operation state of a communication channel according to the state of the communication channel and selects and uses a communication channel capable of transmission/reception of data signals.

Description of Related Art

Vehicle steering control device refers to a device by which the driver of a vehicle may change the steering angle of the wheels of a vehicle based on the steering force applied to the steering wheel or a control signal.

In other words, the steering control device is a device that assists the steering force to allow the user to lightly steer using the steering motor or receives a control signal to drive various actuators of the output side.

Recently, vigorous research on redundancy systems is being conducted as a technology related to autonomous driving.

A steering control device applying a redundancy system generally includes a plurality of sensors, a plurality of electronic control units (ECUs), and a plurality of steering motors.

In the redundancy system, operation may be limited if any one of the plurality of ECUs fails to receive information.

In this case, another ECU may transmit/receive signals through a communication channel to continue to control the steering motor. However, if the other ECU fails to transmit/receive a data signal for assistant control on the steering motor, steering assist control may fail, causing significant problems with the stability of the vehicle.

Accordingly, it is critical to quickly and accurately determine the state of the communication channel and replace a malfunctioning communication channel.

BRIEF SUMMARY

The present embodiments may provide a steering control device and method in which an RWA communication module may detect whether a data signal is transmitted/received through a communication module, output the operation state of the communication module for the communication channel, and perform control to select and use a communication channel capable of transmission/reception of a data signal, thereby increasing reliability.

Further, the present embodiments may provide a steering control device and method that may, although any one communication channel fails, perform control to transmit/receive data signals through another communication channel, thereby increasing stability.

In an aspect, the present embodiments may provide a steering control device comprising a road wheel actuator (RWA) control module including a first actuator receiving a control signal from a first steering controller to control an operation controller of a steering motor and a second actuator controller receiving a control signal from a second steering controller to control the operation of the steering motor and a communication module including a first external communication channel connecting the first actuator controller and the first steering controller to each other and connected to a vehicle and a second external communication channel connecting the second actuator controller and the second steering controller to each other and connected to the vehicle, wherein the RWA control module detects whether a data signal is transmitted/received through the communication module, outputs an operation state for the first external communication channel and the second external communication channel of the communication module, and selects and uses a communication channel capable of data signal transmission/reception.

The RWA control module according to the present embodiments may detect whether the data signal is transmitted/received based communication channel and the second external communication channel and, if it is detected that the data signal is not transmitted/received through the first external communication channel, determine that the first external communication channel fails, output a warning signal for the operation state of the first external communication channel, and select and use the second external communication channel as a communication channel.

The first actuator controller of the RWA control module according to the present embodiments may transmit, to the first steering controller, acknowledgment (ACK) signal and a performance state information signal according to a first control signal received from the first steering controller through the first external communication channel, detect whether a second control signal and a reception ACK signal for the ACK signal are received from the first steering controller, if it is detected that the data signal is not transmitted/received, determine that the first external communication channel fails.

The RWA control module according to the present embodiments may detect whether the data signal is transmitted/received based on a data signal transmitted/received through the first external communication channel and the second external communication channel and, if it is detected that the data signal is not transmitted/received through the second external communication channel, determine that the second external communication channel fails, output a warning signal for the operation state of the second external communication channel, and select and use the first external communication channel as a communication channel.

The second actuator controller of the RWA control module according to the present embodiments may transmit, to the second steering controller, an acknowledgment (ACK) signal and a performance state information signal according to a first control signal received from the second steering controller through the second external communication channel, detect whether a second control signal and a reception ACK signal for the ACK signal are received from the second steering controller, if it is detected that the data signal is not transmitted/received, determine that the second external communication channel fails.

The RWA control module according to the present embodiments may detect whether the data signal is transmitted/received based on a data signal transmitted/received through the first external communication channel and the second external communication channel, if it is detected that the data signal is not transmitted/received through the first external communication channel and the second external communication channel, determine that the first external communication channel and the second external communication channel fail, and output a failure signal for the operation state of the first external communication channel and the second external communication channel.

The communication module according to the present embodiments may further include a first internal communication channel connecting the first steering controller and the second steering controller to each other. The first steering controller and the second steering controller may exchange information through the first internal communication channel, compare data signals transmitted/received through the first external communication channel and the second external communication channel and, if the transmitted/received data signals differ from each other, output a warning signal for the operation state of the first external communication channel or the second external communication channel.

The communication module according to the present embodiments may further include a second internal communication channel connecting the first actuator controller and the second actuator controller to each other. The first actuator controller and the second actuator controller may exchange information through the second internal communication channel, compare data signals transmitted/received through the first external communication channel and the second external communication channel and, if the transmitted/received data signals differ from each other, output a warning signal for the operation state of the first external communication channel or the second external communication channel.

In the present embodiments, when a control priority of the first actuator controller is higher than a control priority of the second actuator controller, the first actuator controller may transfer a control right for the steering motor to the second actuator controller if detecting a failure in the first external communication channel and, if the control right is transferred, the second actuator controller may control the steering motor. In the present embodiments, when a control priority of the first actuator controller is lower than a control priority of the second actuator controller, the second actuator controller may transfer the control right for the steering motor to the first actuator controller if detecting a failure in the second external communication channel, and if the control right is transferred, the first actuator controller may control the steering motor.

The communication module according to the present embodiments may include a gateway for transmitting/receiving a data signal of the first external communication channel and the second external communication channel.

In another aspect, the present embodiments may provide a steering control method, comprising: a communication channel analysis step of detecting whether a data signal is transmitted/received based on a data signal transmitted/received through a communication module, by an RWA control module, a communication channel determination step of determining a communication channel of the communication module as any one state among normal, warning, and fail, according to a result of the detection, by the RWA control module, a communication channel state output step of outputting a signal for an operation state of any one of normal, warning, and fail, according to a result of determining the communication channel of the communication module, by the RWA control module, and a communication channel selection step of selecting and using a communication channel capable of data signal transmission/reception, by the RWA control module.

In the communication channel analysis step according to the present embodiments, the RWA control module may detect whether the data signal is transmitted/received based on a data signal transmitted/received through the first external communication channel and a second external communication channel. In the communication channel determination step, if it is detected that the data signal is not transmitted/received through the first external communication channel, the RWA control module may determine that the first external communication channel fails. In the communication channel state output step, the RWA control module may output a warning signal for the operation state of the first external communication channel if it is determined that the first external communication channel fails. In the communication channel selection step, the RWA control module may select and use the second external communication channel as a communication channel if it is determined that the first external communication channel fails.

In the communication channel analysis step according to the present embodiments, a first actuator controller of the RWA control module may transmit, to the first steering controller, an ACK signal and a performance state information signal according to a first control signal received from the first steering controller through the first external communication channel and detect whether a second control signal and a reception ACK signal for the ACK signal are received from the first steering controller.

In the communication channel analysis step according to the present embodiments, the RWA control module may detect whether the data signal is transmitted/received based on a data signal transmitted/received through the first external communication channel and a second external communication channel. In the communication channel determination step, if it is detected that the data signal is not transmitted/received through the second external communication channel, the RWA control module may determine that the second external communication channel fails. In the communication channel state output step, the RWA control module may output a warning signal for the operation state of the second external communication channel if it is determined that the second external communication channel fails. In the communication channel selection step, the RWA control module may select and use the first external communication channel as a communication channel if it is determined that the second external communication channel fails.

In the communication channel analysis step according to the present embodiments, a second actuator controller of the RWA control module may transmit, to the second steering controller, an ACK signal and a performance state information signal according to a first control signal received from the second steering controller through the second external communication channel and detect whether a second control signal and a reception ACK signal for the ACK signal are received from the second steering controller.

In the communication channel analysis step according to the present embodiments, the RWA control module may detect whether the data signal is transmitted/received based on a data signal transmitted/received through the first external communication channel and a second external communication channel. In the communication channel determination step, if it is detected that the data signal is not transmitted/received through the first external communication channel and the second external communication channel, the RWA control module may determine that the first external communication channel and the second external communication channel fail, and in the communication channel state output step, the RWA control module may output a failure signal for the operation state of the first external communication channel and the second external communication channel.

In the communication channel state output step, a first actuator controller of the RWA control module and a second actuator controller of the RWA control module may exchange information through a second internal communication channel and compare data signals transmitted/received through the first external communication channel and the second external communication channel of the communication module and, if the transmitted/received data signals differ from each other, output a warning signal or a failure signal for the operation state of the first external communication channel or the second external communication channel.

In the present embodiments, when a control priority of the first actuator controller is higher than a control priority of the second actuator controller, the first actuator controller may transfer a control right for the steering motor to the second actuator controller if detecting a failure in the first external communication channel and, if the control right is transferred, the second actuator controller may control the steering motor.

In the present embodiments, when a control priority of the first actuator controller is lower than a control priority of the second actuator controller, the second actuator controller may transfer the control right for the steering motor to the first actuator controller if detecting a failure in the second external communication channel, and if the control right is transferred, the first actuator controller may control the steering motor.

According to the present embodiments, there may be provided a steering control device and method in which an RWA communication module may detect whether a data signal is transmitted/received through a communication module, output the operation state of the communication module for the communication channel, and perform control to select and use a communication channel capable of transmission/reception of a data signal, thereby increasing reliability.

According to the present embodiments, there may also be provided a steering control device and method that may, although any one communication channel fails, perform control to transmit/receive data signals through another communication channel, thereby increasing stability.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
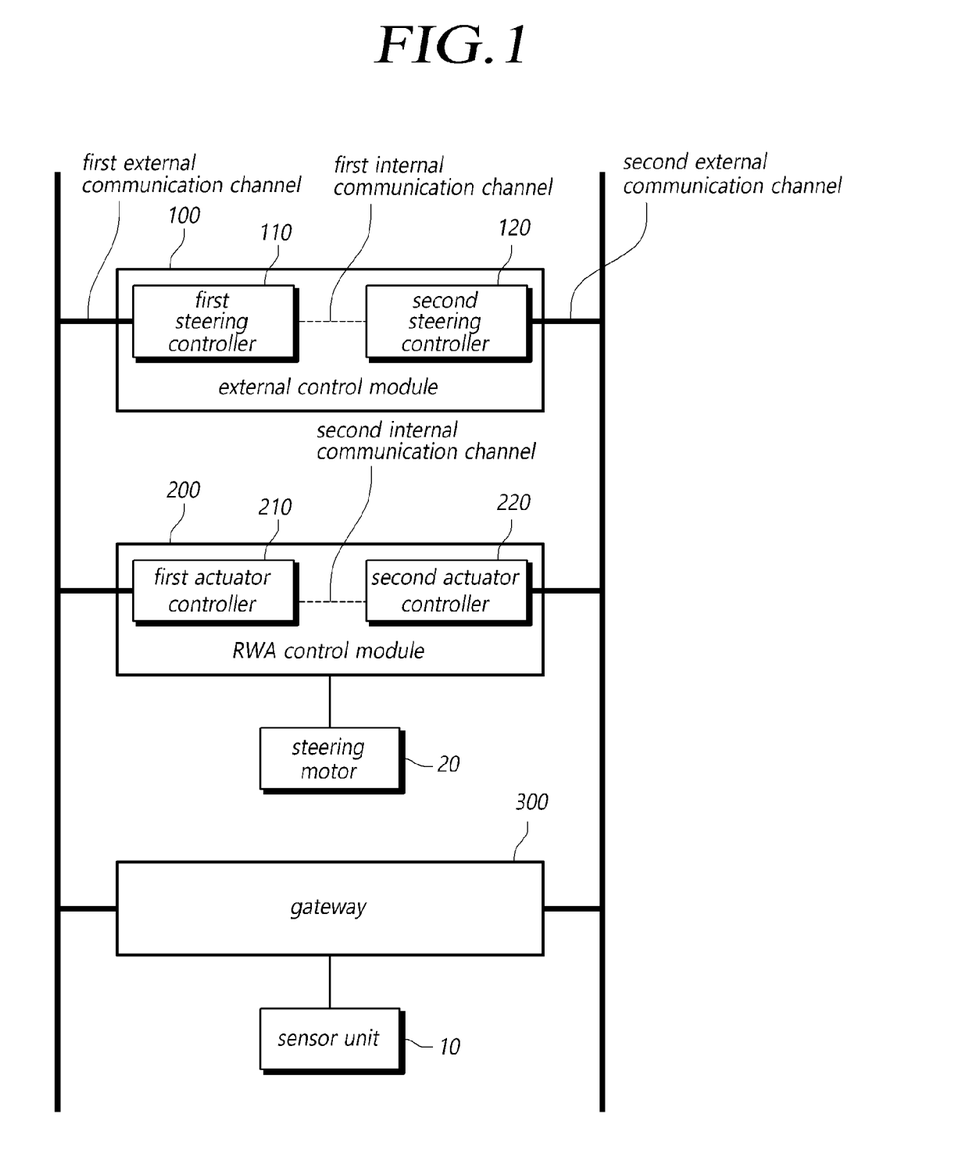
FIG. 1 is a view illustrating a configuration of a steering control device according to an embodiment.
Figure 2:
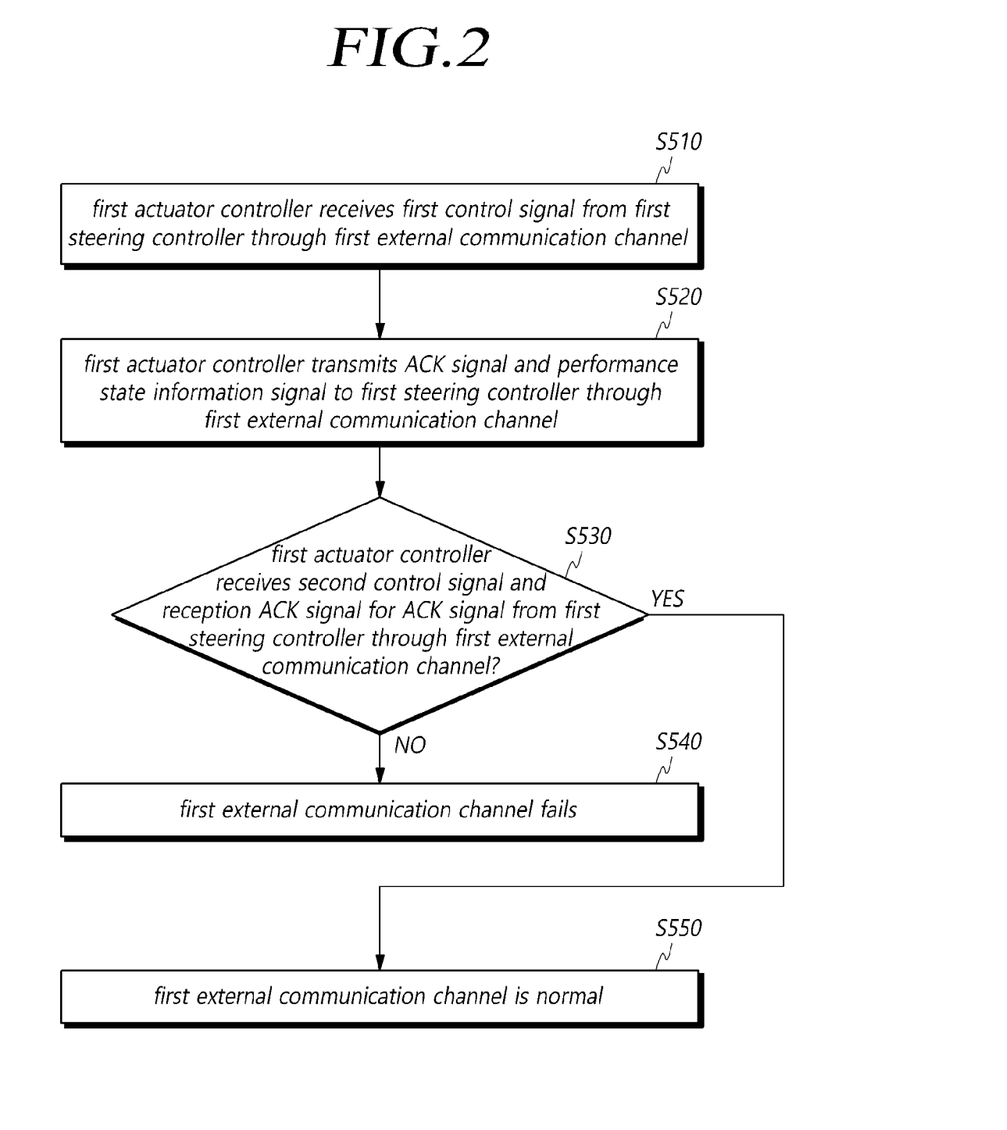
FIG. 2 is a flowchart illustrating a method for detecting an operation state for a communication channel by a first actuator controller of a steering control device according to an embodiment.
Figure 3:
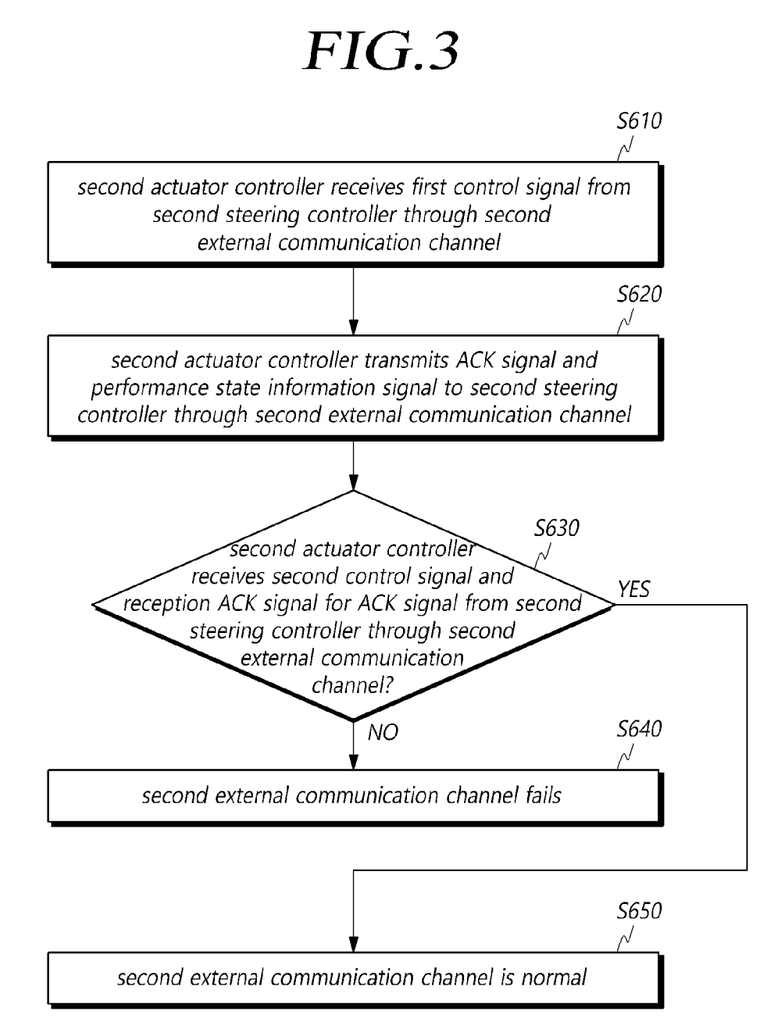
FIG. 3 is a flowchart illustrating a method for detecting an operation state for a communication channel by a second actuator controller of a steering control device according to an embodiment.
Figure 4:
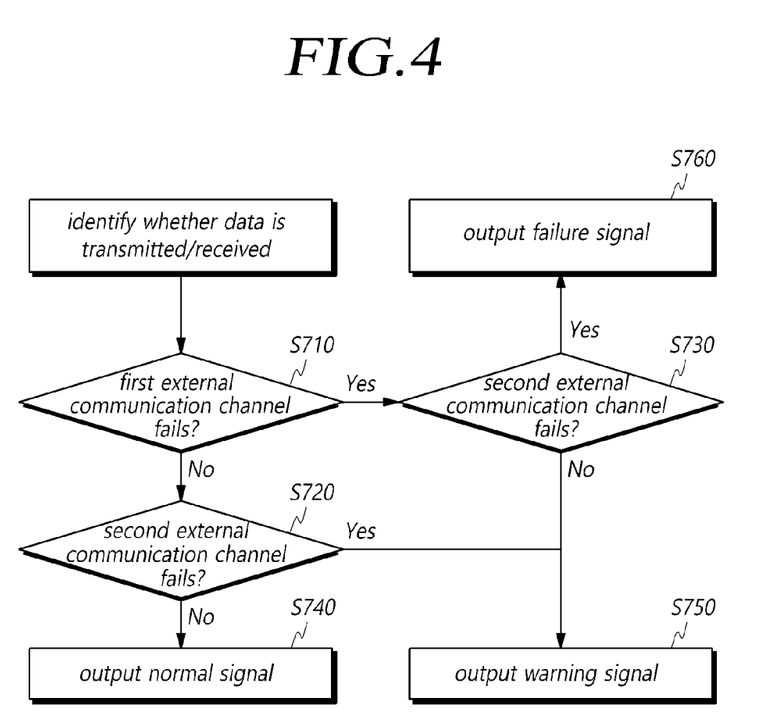
FIG. 4 is a flowchart illustrating a steering control method according to an embodiment.
Figure 5:
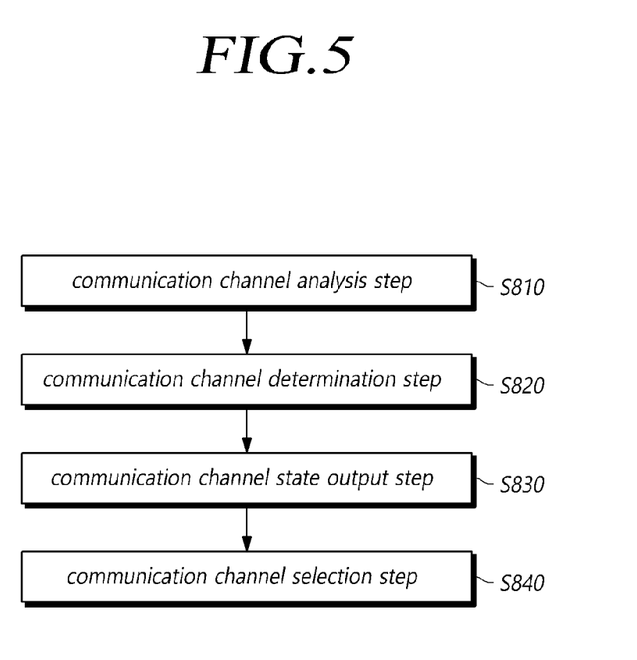
FIG. 5 is a flowchart illustrating a steering control method according to an embodiment.
Figure 6:
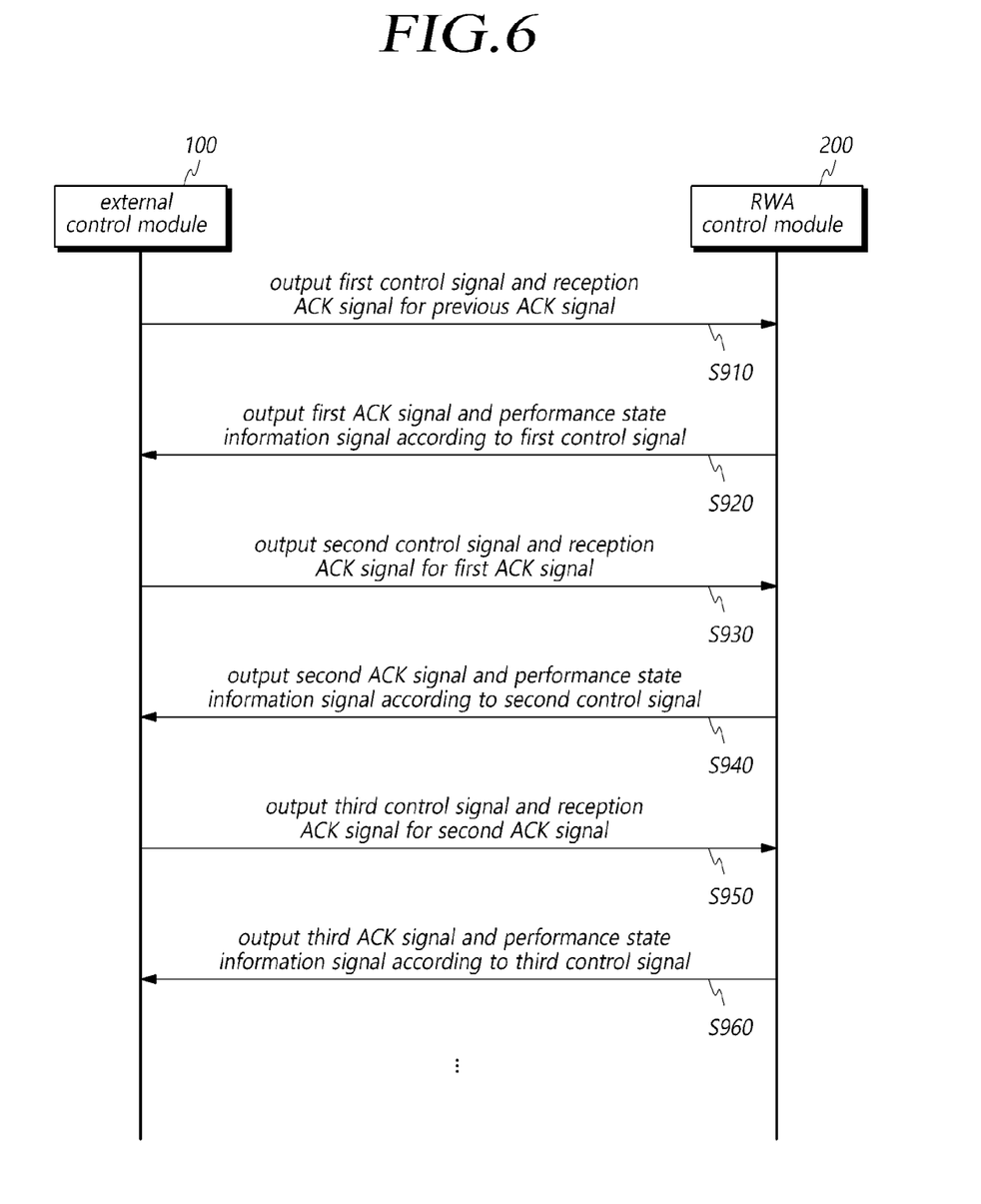
FIG. 6 is a view illustrating data signal flows of an external control module and an RWA control module according to an embodiment.

FIG. 1 is a view illustrating a configuration of a steering control device according to an embodiment. FIG. 2 is a flowchart illustrating a method for detecting an operation state for a communication channel by a first actuator controller of a steering control device according to an embodiment. FIG. 3 is a flowchart illustrating a method for detecting an operation state for a communication channel by a second actuator controller of a steering control device according to an embodiment. FIG. 4 is a flowchart illustrating a steering control method according to an embodiment. FIG. 5 is a flowchart illustrating a steering control method according to an embodiment. FIG. 6 is a view illustrating data signal flows of an external control module and an RWA control module according to an embodiment.

Vehicle steering control devices include electronic power steering (EPS) that assists the manipulating force of the steering wheel using a motor to provide the convenience of driving manipulation, steer-by-wire (SBW) steering devices in which the upper device including the steering wheel and the reaction force motor and the lower device including the rack and the steering motor are mechanically separated from each other, and steering devices that steer the vehicle using an external control module without a steering device and a steering wheel.

The following description of the present embodiments focuses primarily on an autonomous vehicle structure having no steering wheel but, without limitations thereto, the present embodiments may be applied to all types of steering control devices.

The present embodiments may be applied to column-type EPS devices, rack driven EPS devices, or SBW steering devices.

FIG. 1 is a view illustrating a configuration of a steering control device according to an embodiment.

In an aspect, the present embodiments may provide a steering control device comprising a road wheel actuator (RWA) control module 200 including a first actuator controller 210 receiving a control signal from a first steering controller 110 to control an operation of a steering motor 20 and a second actuator controller 220 receiving a control signal from a second steering controller 120 to control the operation of the steering motor 20 and a communication module including a first external communication channel connecting the first actuator controller 210 and the first steering controller 110 to each other and connected to a vehicle and a second external communication channel connecting the second actuator controller 220 and the second steering controller 120 to each other and connected to the vehicle, wherein the RWA control module 200 detects whether a data signal is transmitted/received through the communication module, outputs an operation state for the first external communication channel and the second external communication channel of the communication module, and selects and uses a communication of data signal channel capable transmission/reception.

According to the present embodiments, an example structure of an autonomous vehicle is described. The steering control device may calculate a target rack position based on information from a sensor unit 10 in the RWA control module 200 to be able to change the traveling direction of the vehicle according to the control signal from the external control module 100 and output a target current corresponding to the rack position to the steering motor 20.

Accordingly, the steering control device may move the wheels connected to two opposite ends of the rack bar to the left or right by the rotation of the steering motor 20, thereby allowing the vehicle to move in a desired direction.

The external control module 100 may include a first steering controller 110 outputting a control signal to the first actuator controller 210 and a second steering controller 120 outputting a control signal to the second actuator controller 220.

The RWA control module 200 may perform functions of receiving power from a power supply, generating a target current to be supplied to each winding of the steering motor 20, and supplying the target current.

As shown in FIG. 1, the RWA control module 200 may include a first actuator controller 210 that receives a control signal from the first steering controller 110 to control the operation of the steering motor 20 and a second actuator controller 220 that receives a control signal from the first actuator controller 210 and the second steering controller 120 to control the operation of the steering motor 20.

The RWA control module 200 may be implemented in hardware and software, such as an electronic control unit (ECU) including a microcontroller unit (MCU) 160, an inverter, and a printed circuit board (PCB).

The first actuator controller 210 and the second actuator controller 220 may be, but are not limited to, vehicle electronic control units (ECUs) that receive an electrical signal detected by the sensor unit 10 of the vehicle through the communication module and output digital control signals for driving various actuators.

For example, the steering motor 20 included in the steering control device may be a dual winding steering motor including a first winding motor and a second winding motor.

The communication module may include a first external communication channel for connecting the first steering controller 110 and the first actuator controller 210 to each other and connected to the vehicle and a second external communication channel for connecting the second steering controller 120 and the second actuator controller 220 to each other and connected to the vehicle.

The first external communication channel and the second external communication channel may be public (vehicle) communication lines.

Accordingly, the first steering controller 110 and the first actuator controller 210 may transmit/receive data signals through communication channel of the communication the first external module.

Further, the second steering controller 120 and the second actuator controller 220 may transmit/receive data signals through the second external communication channel of the communication module.

The communication module may be connected to an external node to receive sensing information from the sensor unit 10 including a plurality of sensors and include a gateway 300 connected to a network to transmit/receive data signals of the first steering controller 110 and the second steering controller 120 and the first actuator controller 210 and the second actuator controller 220 to thereby perform communication.

Here, the external node may be a packet switch or a network connection structure for communication with a module outside of the steering control device.

Specifically, the communication module may be connected to the external node to allow the first actuator controller 210 and the second actuator controller 220 to receive a plurality of pieces of sensing information detected by each sensor, from the plurality of sensors mounted to the host vehicle.

In other words, the first actuator controller 210 and the second actuator controller 220 may be connected to the external node through the gateway 300 to receive a plurality of pieces of sensing information detected by each sensor from the plurality of sensors.

The RWA control module 200 may detect whether a data signal is transmitted/received through the communication module, output an operation state for the first external communication channel and the second external communication channel of the communication module, and select and use a communication channel capable of data signal transmission/reception.

Here, the data signal may include a control signal, a performance state information signal according to the control signal, an acknowledgment (ACK) signal, and a reception ACK signal for the ACK signal.

In this case, the control signal may include a control command for steering motor angular velocity, rack position and rack velocity, and the performance state information signal may include the current position of the rack, the RWA state, the maximum possible output of the steering motor, and the active state of an external interface.

As an example, the RWA control module 200 may detect whether a data signal is transmitted/received based on a data signal transmitted/received through the first external communication channel and the second external communication channel, if detecting that the data signal is not transmitted/received through the first external communication channel, determine that the first external communication channel fails, output a warning signal for the operation state of the first external communication channel, and select and use the second external communication channel as the communication channel.

Specifically, the first actuator controller 210 of the RWA control module 200 may transmit, the first steering controller 110, an ACK signal and performance state information signal according d from the first steering to a first control signal received controller 110 through the first external communication channel.

The RWA control module 200 may detect whether a second control signal and a reception ACK signal for the ACK signal from the first steering controller 110 and, if it is detected that the data signal is not transmitted/received, determine that the first external communication channel fails.

FIG. 2 is a flowchart illustrating a method for detecting an operation state for a communication channel by a first actuator controller 210 of a steering control device according to an embodiment.

Referring to FIG. 2, the first actuator controller 210 may receive a first control signal from the first steering controller 110 through the first external communication channel (S510).

The first actuator controller 210 may transmit, the first steering controller 110, an ACK signal and performance state information signal according to a first control signal received from the first steering controller 110 through the first external communication channel (S520).

Here, the performance state information signal may be a signal that includes the result of control performed and the RWA state and the first actuator controller 210 feeds back to the first steering controller 110 through the first external communication channel.

The first actuator controller 210 may detect whether the reception ACK signal for the ACK signal and a second control signal are received from the first steering controller 110 through the first external communication channel (S530).

In this case, if it is detected that the data signal is not transmitted or not received, the first actuator controller 210 may determine that the first external communication channel fails (S540) and, if it is detected that the data signal is first external transmitted/received, determine that the communication channel is normal (S550).

Subsequently, if it is determined that the first external communication channel is normal, the first actuator controller 210 may transmit, to the first steering controller 110, an ACK signal and performance state information signal according to the second control signal received from the first steering controller 110 through the first external e communication channel and detect whether a third control signal sand a reception ACK signal for the ACK signal are received from the first steering controller 110.

In this case, if it is detected that the data signal is not transmitted or not received, the first actuator controller 210 may determine that the first external communication channel fails and, if it is detected that the data signal is transmitted/received, determine that the first external communication channel is normal.

As such, the steering control device according to the present embodiments may repeat the process in which the first actuator controller 210 receives a control signal and a reception ACK signal for an ACK signal and transmits a performance state information signal and an ACK signal. During this course, if it is detected that the control signal and reception ACK signal for the ACK signal are not received from the first steering controller 110, the steering control device may determine that the first external communication channel fails and, if it is detected that the data signal is transmitted/received, determine that the first external communication channel is normal and output the operation state for the communication channel.

Further, the RWA control module 200 may detect whether the data signal is transmitted/received based on a data signal transmitted/received through the first external communication channel and the second external communication channel and, if it is detected that the data signal is not transmitted/received through the second external communication channel, determine that the second external communication channel fails, output a warning signal for the operation state of the second external communication channel, and select and use the first external communication channel as a communication channel.

Specifically, the second actuator controller 220 of the RWA control module 200 may transmit, the second steering controller 120, an ACK signal and performance state information signal according to a first control signal received from the second steering controller 120 through the second external communication channel.

The RWA control module 200 may detect whether a second control signal and a reception ACK signal for the ACK signal from the second steering controller 120 and, if it is detected that the data signal is not transmitted/received, determine that the second external communication channel fails.

FIG. 3 is a flowchart illustrating a method for detecting an operation state for a communication channel by a second actuator controller 220 of a steering control device according to an embodiment.

Referring to FIG. 3, the second actuator controller 220 may receive a first control signal from the second steering controller 120 through the second external communication channel (S610).

The second actuator controller 220 may transmit, the second steering controller 120, an ACK signal and performance state information signal according to a first control signal received from the second steering controller 120 through the second external communication channel (S620).

Here, the performance state information signal may be a signal that includes the result of control performed and the RWA state and the second actuator controller 220 feeds back to the second steering controller 120 through the second external communication channel.

The second actuator controller 220 may detect whether the reception ACK signal for the ACK signal and a second control signal are received from the second steering controller 120 through the second external communication channel (S630).

In this case, if it is detected that the data signal is not transmitted or not received, the second actuator controller 220 may determine that the second external communication channel fails (S640) and, if it is detected that the data signal is transmitted/received, determine that the second external communication channel is normal (S650).

Subsequently, if it is determined that the second external communication channel is normal, the second actuator controller 220 may transmit, to the second steering controller 120, an ACK signal and performance state information signal according to the second control signal received from the second steering controller 120 through the second external communication channel and detect whether a third control signal sand a reception ACK signal for the ACK signal are received from the second steering controller 120.

In this case, if it is detected that the data signal is not transmitted or not received, the second actuator controller 220 may determine that the second external communication channel fails and, if it is detected that the data signal is transmitted/received, determine that the second external communication channel is normal.

As such, the steering control device according to the present embodiments may repeat the process in which the second actuator controller 220 receives a control signal and a reception ACK signal for an ACK signal and transmits a performance state information signal and an ACK signal. During this course, if it is detected that the control signal and reception ACK signal for the ACK signal are not received from the second steering controller 120, the steering control device may determine that the second external communication channel fails and, if it is detected that the data signal is transmitted/received, determine that the second external communication channel is normal and output the operation state for the communication channel.

FIG. 4 is a flowchart illustrating a steering control method according to an embodiment.

Here, the RWA control module 200 may output a normal signal for the first external communication channel and the second external communication channel if it is determined that the first external communication channel and the second external communication channel are normal (S710, S720, and S740).

Further, if it is determined that the first external communication channel fails, and the second external communication channel is normal, the RWA control module 200 may output a warning signal for the operation state of the first external communication channel (S710, S730, and S750).

Further, if it is determined that the first external communication channel is normal, and the second external communication channel fails, the RWA control module 200 may output a warning signal for the operation state of the second external communication channel (S710, S720, and S750).

Further, the RWA control module 200 may detect whether the data signal is transmitted/received based on a data signal transmitted/received through the first external communication channel and the second external communication channel, if it is detected that the data signal is not transmitted/received through the first external communication channel and the second external communication channel, determine that the first external communication channel second external communication channel fail, and output a failure signal for the operation state of the first external communication channel and the second external communication channel (S710, S730, and S760).

Specifically, the first actuator controller 210 of the RWA control module 200 may transmit, the first steering controller 110, an ACK signal and performance state information signal according to a first control signal received from the first steering controller 110 through the first external communication channel.

The RWA control module 200 may detect whether a second control signal and a reception ACK signal for the ACK signal from the first steering controller 110 and, if it is detected that the data signal is not transmitted/received, determine that the first external communication channel fails.

Simultaneously, the RWA control module 200 may transmit, the second steering controller 120, an ACK signal and performance state information signal according to a first control signal received from the second steering controller 120 through the second external communication channel.

The RWA control module 200 may detect whether a second control signal and a reception ACK signal for the ACK signal from the second steering controller 120 and, if it is detected that the data signal is not transmitted/received, determine that the second external communication channel fails.

Accordingly, the RWA control module 200 may determine that the first external communication channel and the second external communication channel fail and output a failure signal for the operation state of the first external communication channel and the second external communication channel.

Further, the communication module may further include a first internal communication channel connecting the first steering controller 110 and the second steering controller 120 to each other.

Accordingly, the first steering controller 110 and the second steering controller 120 may exchange information through the first internal communication compare channel, data signals transmitted/received through the first external communication channel and the second external communication channel and, if the transmitted/received data signals differ from each other, output a warning signal or a failure signal for the operation state of the first external communication channel or the second external communication channel.

In this case, the first internal communication channel may be a private communication line that is not electrically connected to the external node and allows only the first steering controller 110 and the second steering controller 120 to transmit/receive data signals.

Further, the communication module may further include a second internal communication channel connecting the first actuator controller 210 and the second actuator controller 220 to each other.

Accordingly, the first actuator controller 210 and the second actuator controller 220 may exchange information through the second internal communication channel, compare data signals transmitted/received through external communication channel and the second external communication channel and, if the transmitted/received data signals differ from each other, output a warning signal or a failure signal for the operation state of the first external communication channel or the second external communication channel.

In this case, the second internal communication channel may be a private communication line that is not electrically connected to the external node and allows only the first actuator controller 210 and the second actuator controller 220 to transmit/receive data signals.

Here, when the control priority of the first actuator controller 210 is higher than the control priority of the second actuator controller 220, the first actuator controller 210 may transfer the control right for the steering motor 20 to the second actuator controller 220 if detecting a failure in the first external communication channel. The second actuator controller 220 may control the steering motor 20 if the control right is transferred.

When the control priority of the first actuator controller 210 is lower than the control priority of the second actuator controller 220, the second actuator controller 220 may transfer the control right for the steering motor 20 to the first actuator controller 210 if detecting a failure in the second external communication channel. The first actuator controller 210 may control the steering motor 20 if the control right is transferred.

The steering control device according to the present embodiments may transfer the operation state for each different communication channel of the communication module to the autonomous driving module, and the autonomous driving module may control the vehicle according to the operation state of the communication module.

In other words, the present embodiments may allow the vehicle to normally travel if external communication channels are normal or any one external communication channel fails and, if all of the external communication channels fail, control the vehicle to change the lane to the shoulder to stop the vehicle according to the operation state of the communication module output from the RWA control module 200.

In this case, the steering control device may output the operation state for each different communication channel of the communication module on a display unit including, e.g., a liquid crystal display (LCD) or head-up display (HUD) or output it through a sound output unit, such as a speaker, which may output audio data signals.

FIG. 5 is a flowchart illustrating a steering control method according to an embodiment.

A steering control method is described with reference to FIG. 5. The steering control method may comprise a communication channel analysis step S810 of detecting whether a data signal is transmitted/received based on a data signal transmitted/received through a communication module, by an RWA control module 200, a communication channel determination step S820 of determining a communication channel of the communication module as any one state among normal, warning, and fail, according to a result of the detection, by the RWA control module 200, a communication channel state output step S830 of outputting a signal for an operation state of any one of normal, warning, and fail, according to a result of determining the communication channel of the communication module, by the RWA control module 200, and a communication channel selection step S840 of selecting and using a communication channel capable of data signal transmission/reception, by the RWA control module 200.

Specifically, in the communication channel analysis step S810, the RWA control module 200 may detect whether a data signal is transmitted/received based on a data signal transmitted/received through the first external communication channel and the second external communication channel.

In this case, in the communication channel analysis step S810, the first actuator controller 210 of the RWA control module 200 may transmit, to the first steering controller 110, an ACK signal and a performance state information signal according to a first control signal received from the first steering controller 110 through the first external communication channel and detect whether a second control signal and a reception ACK signal for the ACK signal are received from the first steering controller 110.

In the communication channel determination step S820, if it is detected that the data signal is not transmitted/received through the first external communication channel, the RWA control module 200 may determine that the first external communication channel fails.

In the communication channel state output step S830, if it is determined that the first external communication channel fails, the RWA control module 200 may output a warning signal for the operation state of the first external communication channel.

In the communication channel selection step S840, if it is determined that the first external communication channel fails, the RWA control module 200 may select and use the second external communication channel as the communication channel.

Meanwhile, in the communication channel analysis step S810, the RWA control module 200 may detect whether a data signal is transmitted/received based on a data signal transmitted/received through the first external communication channel and the second external communication channel.

In this case, in the communication channel analysis step S810, the second actuator controller 220 of the RWA control module 200 may transmit, to the second steering controller 120, an ACK signal and a performance state information signal according to a first control signal received from the second steering controller 120 through the second external communication channel and detect whether a second control signal and a reception ACK signal for the ACK signal are received from the second steering controller 120.

In the communication channel determination step S820, if it is detected that the data signal is not transmitted/received through the second external communication channel, the RWA control module 200 may determine that the second external communication channel fails.

In the communication channel state output step S830, if it is determined that the second external communication channel fails, the RWA control module 200 may output a warning signal for the operation state of the second external communication channel.

In the communication channel selection step S840, if it is determined that the second external communication channel fails, the RWA control module 200 may select and use the first external communication channel as the communication channel.

Meanwhile, in the communication channel analysis step S810, the RWA control module 200 may detect whether a data signal is transmitted/received based on a data signal transmitted/received through the first external communication channel and the second external communication channel.

In the communication channel determination step S820, if it is detected that the data signal is not transmitted/received through the first external communication channel and the second external communication channel, the RWA control module 200 may determine that the first external communication channel and the second external communication channel fail.

In the communication channel state output step S830, the RWA control module 200 may output a warning signal for the operation state of the second external communication channel.

Further, in the communication channel state output step S830, the first actuator controller the second actuator controller 220 may exchange information through the second internal communication channel.

In the communication channel state output step S830, data signals transmitted/received through the first external communication channel and the second external communication channel of the communication module may be compared and, if the transmitted/received data signals differ from each other, a warning signal or a failure signal for the operation state of the first external communication channel or the second external communication channel may be output.

Here, when the control priority of the first actuator controller 210 is higher than the control priority of the second actuator controller 220, the first actuator controller 210 may transfer the control right for the steering motor 20 to the second actuator controller 220 if detecting a failure in the first external communication channel. The second actuator controller 220 may control the steering motor 20 if the control right is transferred.

When the control priority of the first actuator controller 210 is lower than the control priority of the second actuator controller 220, the second actuator controller 220 may transfer the control right for the steering motor 20 to the first actuator controller 210 if detecting a failure in the second external communication channel. The first actuator controller 210 may control the steering motor 20 if the control right is transferred.

The steering control device according to the present embodiments may transfer the operation state for each different communication channel of the communication module to the autonomous driving module, and the autonomous driving module may control the vehicle according to the operation state of the communication module.

FIG. 6 is a view illustrating data signal flows of an external control module 100 and an RWA control module 200 according to an embodiment.

In the present embodiments, the RWA control module 200 may repeat a process of receiving a control signal and a reception ACK signal for an ACK signal (S910, S930, and S950) and transmitting a performance state information signal and an ACK signal (S920, S940, and S960) and, if it is detected that the control signal and the reception ACK signal for the ACK signal are not received from the external control module 100 in each process, determine that the communication module is abnormal and, if it is detected that a data signal is transmitted/received, determine that the communication module is normal.

As such, according to the present embodiments, an RWA communication module may detect whether a data signal is transmitted/received through a communication module, output the operation state of the communication module for the communication channel, and perform control to select and use a communication channel capable of transmission/reception of a data signal, thereby increasing reliability. Further, although any one communication channel fails, it is possible to perform control to transmit/receive data signals through another communication channel, thereby increasing stability.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steering control device, comprising:
a road wheel actuator (RWA) control module including a first actuator controller receiving a control signal from a first steering controller to control an operation of a steering motor and a second actuator controller receiving a control signal from a second steering controller to control the operation of the steering motor; and
a communication module including a first external communication channel connecting the first actuator controller and the first steering controller to each other and connected to a vehicle and a second external communication channel connecting the second actuator controller and the second steering controller to each other and connected to the vehicle,
wherein the RWA control module detects whether a data signal is transmitted/received through the communication module, outputs an operation state for the first external communication channel and the second external communication channel of the communication module, and selects and uses a communication channel capable of data signal transmission/reception.

2. The steering control device of claim 1, wherein the RWA control module is configured to,
detect whether the data signal is transmitted/received based on a data signal transmitted/received through the first external communication channel and the second external communication channel,
if it is detected that the data signal is not transmitted/received through the first external communication channel, determine that the first external communication channel fails,
output a warning signal for the operation state of the first external communication channel, and select and use the second external communication channel as a communication channel.

3. The steering control device of claim 2, wherein the first actuator controller of the RWA control module transmits, to the first steering controller, an acknowledgment (ACK) signal and a performance state information signal according to a first control signal received from the first steering controller through the first external communication channel, detects whether a second control signal and a reception ACK signal for the ACK signal are received from the first steering controller, if it is detected that the data signal is not transmitted/received, determines that the first external communication channel fails.

4. The steering control device of claim 1, wherein the RWA control module is configured to,
detect whether the data signal is transmitted/received based on a data signal transmitted/received through the first external communication channel and the second external communication channel,
if it is detected that the data signal is not transmitted/received through the second external communication channel, determine that the second external communication channel fails,
output a warning signal for the operation state of the second external communication channel, and select and use the first external communication channel as a communication channel.

5. The steering control device of claim 4, wherein the second actuator controller of the RWA control module transmits, to the second steering controller, an acknowledgment (ACK) signal and a performance state information signal according to a first control signal received from the second steering controller through the second external communication channel, detects whether a second control signal and a reception ACK signal for the ACK signal are received from the second steering controller, if it is detected that the data signal is not transmitted/received, determines that the second external communication channel fails.

6. The steering control device of claim 1, wherein the RWA control module is configured to,
detect whether the data signal is transmitted/received based on a data signal transmitted received through the first external communication channel and the second external communication channel,
if it is detected that the data signal is not transmitted/received through the first external communication channel and the second external communication channel, determine that the first external communication channel and the second external communication channel fail, and
output a failure signal for the operation state of the first external communication channel and the second external communication channel.

7. The steering control device of claim 1, wherein the communication module further includes an first internal communication channel connecting the first steering controller and the second steering controller to each other, and
wherein the first steering controller and the second steering controller exchange information through the first internal communication channel, compare data signals transmitted/received through the first external communication channel and the second external communication channel and, if the transmitted/received data signals differ from each other, output a warning signal or a failure signal for the operation state of the first external communication channel or the second external communication channel.

8. The steering control device of claim 1, wherein the communication module further includes a second internal communication channel connecting the first actuator controller and the second actuator controller to each other, and
wherein the first actuator controller and the second actuator controller exchange information through the second internal communication channel, compare data signals transmitted/received through the first external communication channel and the second external communication channel and, if the transmitted/received data signals differ from each other, output a warning signal or a failure signal for the operation state of the first external communication channel or the second external communication channel.

9. The steering control device of claim 1, wherein when a control priority of the first actuator controller is higher than a control priority of the second actuator controller, the first actuator controller transfers a control right for the steering motor to the second actuator controller if detecting a failure in the first external communication channel, and if the control right is transferred, the second actuator controller controls the steering motor.

10. The steering control device of claim 9, wherein when a control priority of the first actuator controller is lower than a control priority of the second actuator controller, the second actuator controller transfers the control right for the steering motor to the first actuator controller if detecting a failure in the second external communication channel, and if the control right is transferred, the first a actuator controller controls the steering motor.

11. The steering control device of claim 1, wherein the communication module includes a gateway for transmitting/receiving a data signal of the first external communication channel and the second external communication channel.

12. A steering control method, comprising:
a communication channel analysis step of detecting whether a data signal is transmitted/received based on a data signal transmitted/received through a communication module, by an RWA control module;
a communication channel determination step of determining a communication channel of the communication module as any one state among normal, warning, and fail, according to a result of the detection, by the RWA control module;
a communication channel state output step of outputting a signal for an operation state of any one of normal, warning, and fail, according to a result of determining the communication channel of the communication module, by the RWA control module; and
a communication channel selection step of selecting and using a communication channel capable of data signal transmission/reception, by the RWA control module.

13. The steering control method of claim 12, wherein in the communication channel analysis step, the RWA control module detects whether the data signal is transmitted/received based on a data signal transmitted/received through the first external communication channel and a second external communication channel,
wherein in the communication channel determination step, if it is detected that the data signal is not transmitted/received through the first external communication channel, the RWA control module determines that the first external communication channel fails,
wherein in the communication channel state output step, the RWA control module outputs a warning signal for the operation state of the first external communication channel if it is determined that the first external communication channel fails, and
wherein in the communication channel selection step, the RWA control module selects and uses the second external communication channel as a communication channel if it is determined that the first external communication channel fails.

14. The steering control method of claim 13, wherein in the communication channel analysis step, a first actuator controller of the RWA control module transmits, to the first steering controller, an ACK signal and a performance state information signal according to a first control signal received from the first steering controller through the first external communication channel and detects whether a second control signal and a reception ACK signal for the ACK signal are received from the first steering controller.

15. The steering control method of claim 12, wherein in the communication channel analysis step, the RWA control module detects whether the data signal is transmitted/received based on a data signal transmitted/received through the first external communication channel and a second external communication channel,     wherein in the communication channel determination step, if it is detected that the data signal is not transmitted/received through the second external communication channel, the RWA control module determines that the second external communication channel fails,     wherein in the communication channel state output step, the RWA control module outputs a warning signal for the operation state of the second external communication channel if it is determined that the second external communication channel fails, and     wherein in the communication channel selection step, the RWA control module selects and uses the first external communication channel as a communication channel if it is determined that the second external communication channel fails.

16. The steering control method of claim 15, wherein in the communication channel analysis step, a second actuator controller of the RWA control module transmits, to the second steering controller, an ACK signal and a performance state information signal according to a first control signal received from the second steering controller through the second external communication channel and detects whether a second control signal and a reception ACK signal for the ACK signal are received from the second steering controller.

17. The steering control method of claim 12, wherein in the communication channel analysis step, the RWA control module detects whether the data signal is transmitted/received based on a data signal transmitted/received through the first external communication channel and a second external communication channel,     wherein in the communication channel determination step, if it is detected that the data signal is not transmitted/received through the first external communication channel and the second external communication channel, the RWA control module determines that the first external communication channel and the second external communication channel fail, and     wherein in the communication channel state output step, the RWA control module outputs a failure signal for the operation state of the first external communication channel and the second external communication channel.

18. The steering control method of claim 12, wherein in the communication channel state output step, a actuator first controller of the RWA control module and a second actuator controller of the RWA control module exchange information through a second internal communication channel and compare data signals transmitted/received through the first external communication channel and the second external communication channel of the communication module and, if the transmitted/received data signals differ from each other, output a warning signal or a failure signal for the operation state of the first external communication channel or the second external communication channel.

19. The steering control method of claim 18, wherein when a control priority of the first actuator controller is higher than a control priority of the second actuator controller, the first actuator controller transfers a control right for a steering motor to the second actuator controller if detecting a failure in the first external communication channel, and if the control right is transferred, the second actuator controller controls the steering motor.

20. The steering control method of claim 19, wherein when a control priority of the first actuator controller is lower than a control priority of the second actuator controller, the second actuator controller transfers the control right for the steering motor to the first actuator controller if detecting a failure in the second external communication channel, and if the control right is transferred, the first actuator controller controls the steering motor.

\* \* \* \* \*